United States Patent
Lee et al.

(10) Patent No.: US 10,694,511 B2
(45) Date of Patent: Jun. 23, 2020

(54) METHOD FOR RECEIVING DOWNLINK CHANNEL OR TRANSMITTING UPLINK CHANNEL IN WIRELESS COMMUNICATION SYSTEM AND DEVICE FOR SAME

(71) Applicant: LG ELECTRONICS INC., Seoul (KR)

(72) Inventors: Hyunho Lee, Seoul (KR); Suckchel Yang, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 56 days.

(21) Appl. No.: 15/746,638

(22) PCT Filed: Aug. 9, 2016

(86) PCT No.: PCT/KR2016/008758
§ 371 (c)(1),
(2) Date: Jan. 22, 2018

(87) PCT Pub. No.: WO2017/026777
PCT Pub. Date: Feb. 16, 2017

(65) Prior Publication Data
US 2018/0227885 A1   Aug. 9, 2018

Related U.S. Application Data

(60) Provisional application No. 62/203,915, filed on Aug. 12, 2015.

(51) Int. Cl.
*H04W 72/04* (2009.01)
*H04L 5/00* (2006.01)
*H04W 72/12* (2009.01)

(52) U.S. Cl.
CPC .......... *H04W 72/042* (2013.01); *H04L 5/001* (2013.01); *H04L 5/0055* (2013.01);
(Continued)

(58) Field of Classification Search
CPC .......... H04W 72/042; H04W 72/1289; H04L 5/0091; H04L 5/0055; H04L 5/001; H04L 5/0048; H04L 5/0023; H04J 11/00
See application file for complete search history.

(56) References Cited

U.S. PATENT DOCUMENTS

2006/0251119 A1*  11/2006  Ramesh .......... H04L 45/38
                                                  370/468
2012/0039252 A1*   2/2012  Damnjanovic ...... H04L 1/0026
                                                  370/328
(Continued)

FOREIGN PATENT DOCUMENTS

CN      103416015 A      11/2013
CN      104079388 A      10/2014
(Continued)

*Primary Examiner* — Andrew Lai
*Assistant Examiner* — Harry H Kim
(74) *Attorney, Agent, or Firm* — Birch, Stewart, Kolasch & Birch, LLP

(57) ABSTRACT

A method for receiving a signal or transmitting a signal on a plurality of component carriers (CCs) in a wireless communication system, according to an embodiment of the present invention, is performed by means of a terminal and comprises the steps of: in order to receive multiple CC downlink control information scheduling one or more CCs, blind decoding the multiple CC downlink control information in a search space on a particular CC; and, on the basis of the received multiple CC downlink control information, transmitting an uplink control or data channel or receiving a downlink data channel on one or more of the CCs, wherein the received multiple CC downlink control information can
(Continued)

comprise transmission mode (TM) dependent multiple CC downlink control information or fallback multiple CC downlink control information.

16 Claims, 6 Drawing Sheets

(52) U.S. Cl.
CPC .......... *H04L 5/0091* (2013.01); *H04L 5/0023* (2013.01); *H04L 5/0048* (2013.01); *H04W 72/1289* (2013.01)

(56) References Cited

U.S. PATENT DOCUMENTS

| | | | |
|---|---|---|---|
| 2013/0058294 A1* | 3/2013 | Miki | H04L 5/0007 370/329 |
| 2013/0195039 A1* | 8/2013 | Pan | H04L 5/0007 370/329 |
| 2013/0295949 A1* | 11/2013 | Seo | H04W 72/082 455/452.1 |
| 2013/0343311 A1 | 12/2013 | Tee et al. | |
| 2014/0119348 A1* | 5/2014 | Zhang | H04W 72/042 370/336 |
| 2015/0043517 A1* | 2/2015 | Chen | H04L 1/1685 370/329 |
| 2016/0315732 A1* | 10/2016 | Park | H04L 1/0038 |

FOREIGN PATENT DOCUMENTS

| | | |
|---|---|---|
| WO | WO 2014/027779 A1 | 2/2014 |
| WO | WO 2014/051293 A1 | 4/2014 |

\* cited by examiner

METHOD FOR RECEIVING DOWNLINK CHANNEL OR TRANSMITTING UPLINK CHANNEL IN WIRELESS COMMUNICATION SYSTEM AND DEVICE FOR SAME

CROSS REFERENCE TO RELATED APPLICATIONS

This application is the National Phase of PCT/KR2016/008758 filed on Aug. 09, 2016, which claims priority under 35 U.S.C. §119(e) to U.S. Provisional Application No. 62/203,915 filed on Aug. 12, 2015, all of which are hereby expressly incorporated by reference into the present application.

TECHNICAL FIELD

The present invention relates to a wireless communication system, and more particularly, to a method of receiving a downlink channel or a method of transmitting an uplink channel using downlink control information scheduling multiple component carriers in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

A technical task of the present invention is to propose a method of performing communication according to downlink control information scheduling multiple component carriers.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving or transmitting a signal, which is received or transmitted by a terminal on a plurality of component carriers (CCs) in a wireless communication system, includes performing blind decoding on multi-CC downlink control information in a search space of a specific CC to receive the multi-CC downlink control information that schedules at least one of the plurality of CCs and receiving a downlink data channel or transmitting an uplink control channel or a data channel on at least one of the plurality of CCs according to the received multi-CC downlink control information. In this case, the received multi-CC downlink control information may include transmission mode (TM)-dependent multi- CC downlink control information or fallback multi-CC downlink control information.

Additionally or alternatively, when downlink control information for a primary CC is not included in the received multi-CC downlink control information, the method may further include additionally receiving single-CC downlink control information for the primary CC.

Additionally or alternatively, the method may further include receiving information on a specific CC on which the blind decoding is to be performed.

Additionally or alternatively, when both TM-dependent multi-CC downlink control information and TM-dependent single CC downlink control information are received for the a CC among the plurality of CCs at specific timing, the method may further include discarding the received TM-dependent single CC downlink control information.

Additionally or alternatively, when the terminal fails to perform blind decoding on the multi-CC downlink control information, the method may further include performing blind decoding on fallback multi-CC downlink control information on a predetermined CC.

Additionally or alternatively, the multi-CC downlink control information may be received when the number of the plurality of CCs is equal to or greater than a specific number.

Additionally or alternatively, the number of CCs scheduled by the multi-CC downlink control information may vary per subframe.

Additionally or alternatively, fields for a CC not scheduled by the multi-CC downlink control information may be used as a different field for a CC scheduled by the multi-CC downlink control information.

Additionally or alternatively, the different field may include a virtual cyclic redundancy check (CRC) bit field or an uplink scheduling-related field.

Additionally or alternatively, the multi-CC downlink control information includes an ACKnowledgement/Negative ACK (ACK/NACK) resource indicator (ARI) field being independent from a transmit power control command field, and the ARI field may indicate a resource used for ACK/NACK feedback for a non-primary-CC scheduled by the multi-CC downlink control information.

To further achieve these and other advantages and in accordance with the purpose of the present invention, according to a different embodiment, a terminal configured to receive or transmit a signal on a plurality of component carriers (CCs) in a wireless communication system includes a transmitter, a receiver, and a processor that controls the transmitter and the receiver, the processor performs blind decoding on multi-CC downlink control information in a search space of a specific CC to receive the multi-CC downlink control information that schedules at least one of the plurality of CCs, receives a downlink data channel or transmit an uplink control channel or a data channel on at least one of the plurality of CCs according to the received multi-CC downlink control information. In this case, the received multi-CC downlink control information may include transmission mode (TM)-dependent multi-CC downlink control information or fallback multi-CC downlink control information.

Additionally or alternatively, when downlink control information for a primary CC is not contained in the received multi-CC downlink control information, the processor may additionally receives single-CC downlink control information for the primary CC.

Additionally or alternatively, the processor may receive information on a specific CC on which the blind decoding is to be performed.

Additionally or alternatively, when both TM-dependent multi-CC downlink control information and TM-dependent single CC downlink control information are received for a specific CC among the plurality of CCs at specific timing, the processor may discard the received TM-dependent single CC downlink control information.

Additionally or alternatively, when the terminal fails to perform blind decoding on the multi-CC downlink control information, the processor may perform blind decoding on fallback multi-CC downlink control information on a predetermined CC.

Additionally or alternatively, the multi-CC downlink control information may be received when the number of the plurality of CCs is equal to or greater than a specific number.

Additionally or alternatively, the number of CCs scheduled by the multi-CC downlink control information may vary per subframe.

Additionally or alternatively, fields for a CC not scheduled by the multi-CC downlink control information may be used as a different field for a CC scheduled by the multi-CC downlink control information.

Additionally or alternatively, the different field can include a virtual cyclic redundancy check (CRC) bit field or an uplink scheduling-related field.

Additionally or alternatively, the multi-CC downlink control information may include an ACK/NACK (ACKnowledgement/Negative ACK (ACK/NACK) resource indicator (ART) field being independent from a transmit power control command field and the ART field can indicate a resource used for ACK/NACK feedback for a non-primary-CC scheduled by the multi-CC downlink control information.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently transmit and receive downlink control information on multiple component carriers in a wireless communication system. Hence, it is able to efficiently receive a downlink data channel of a user equipment or transmit an uplink control channel or a data channel.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
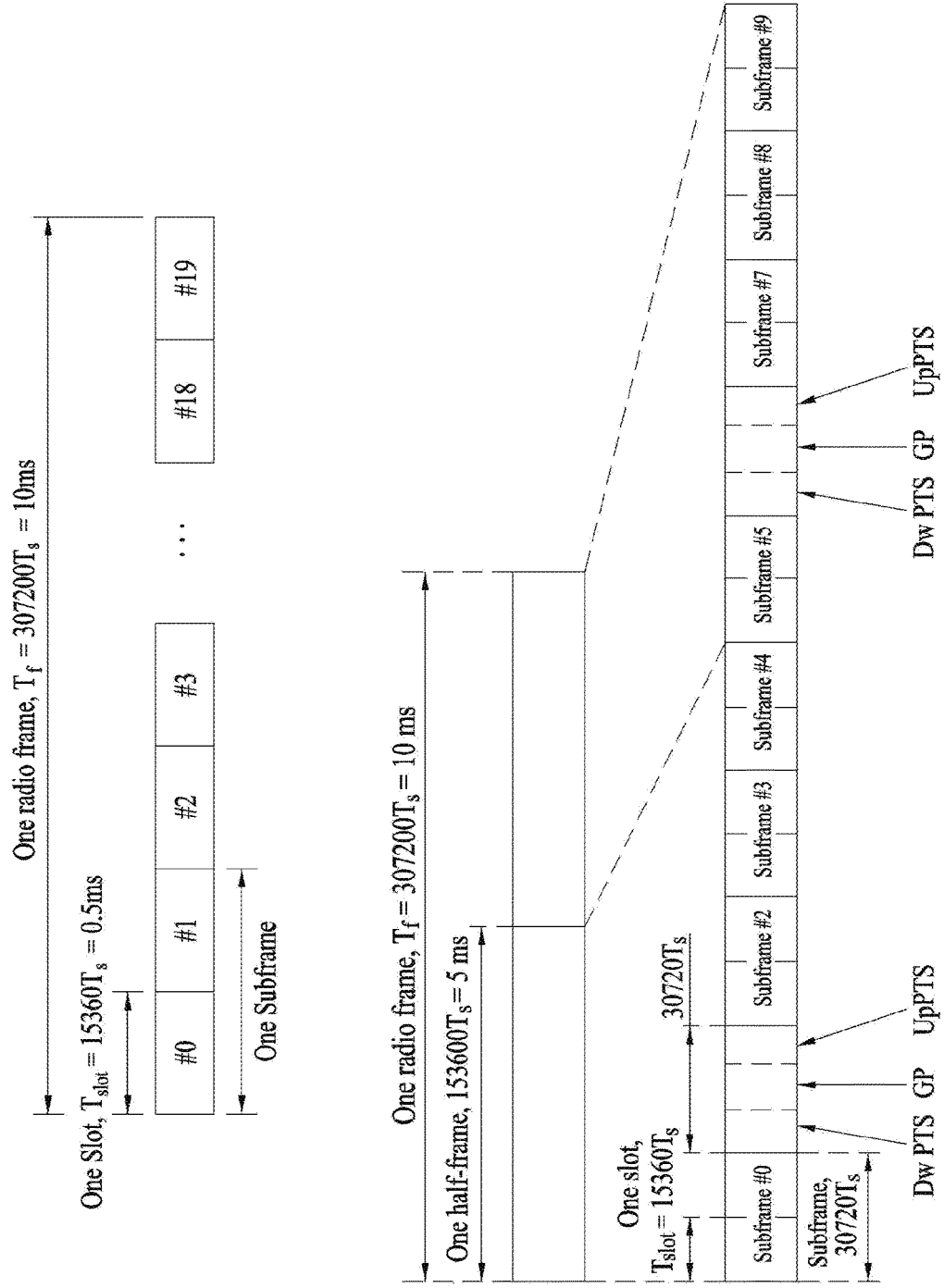
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/ received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |

TABLE 2-continued

|  | Normal cyclic prefix in downlink | | | Extended cyclic prefix in downlink | | |
| --- | --- | --- | --- | --- | --- | --- |
|  |  | UpPTS | |  | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
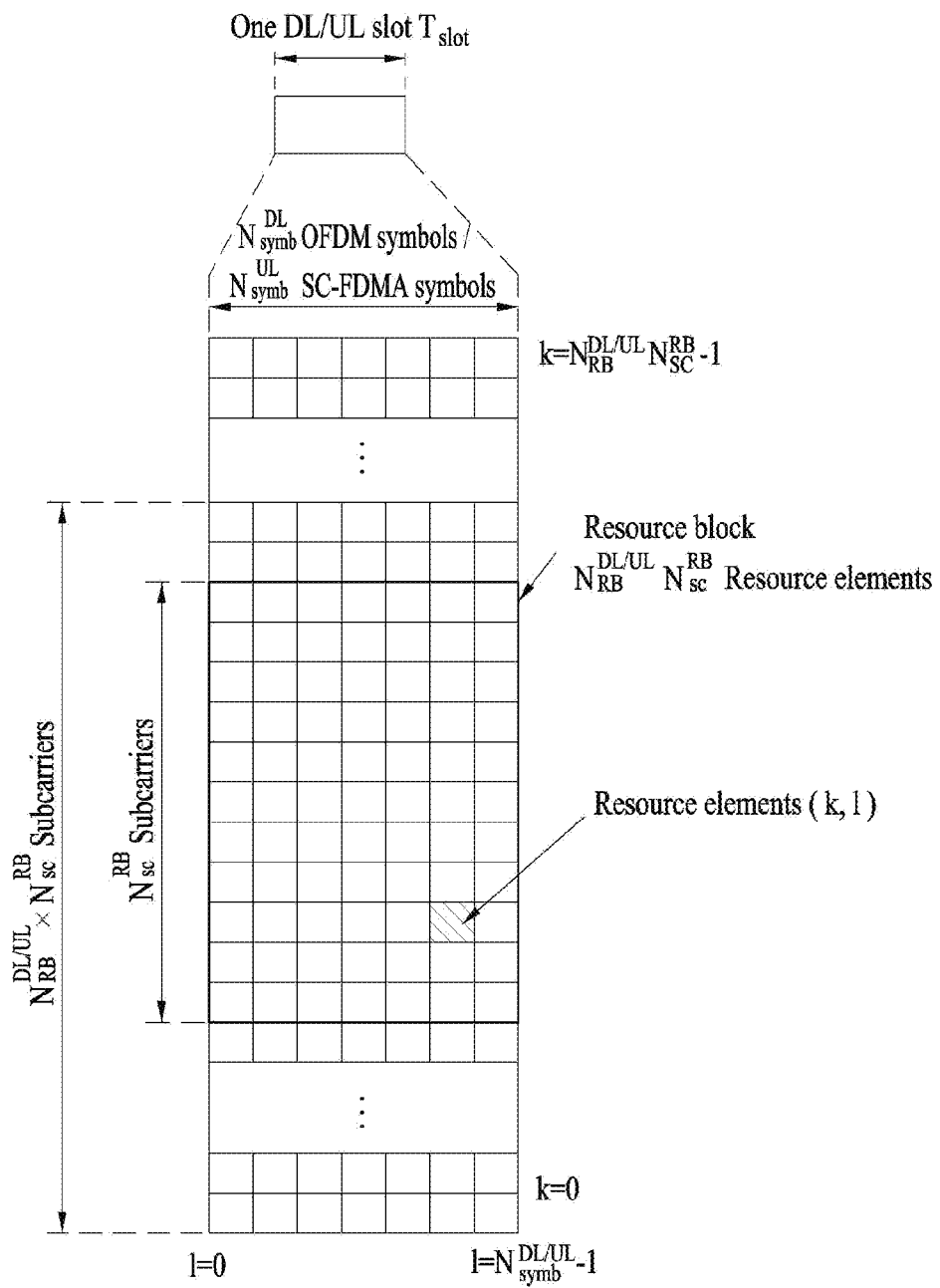
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{RB}^{DL/UL} * N_{sc}^{RB}$ REs. Each RE in a resource grid can be uniquely defined by an index pair (k, l) in a slot. Here, k is an index in the range of 0 to $N_{RB}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
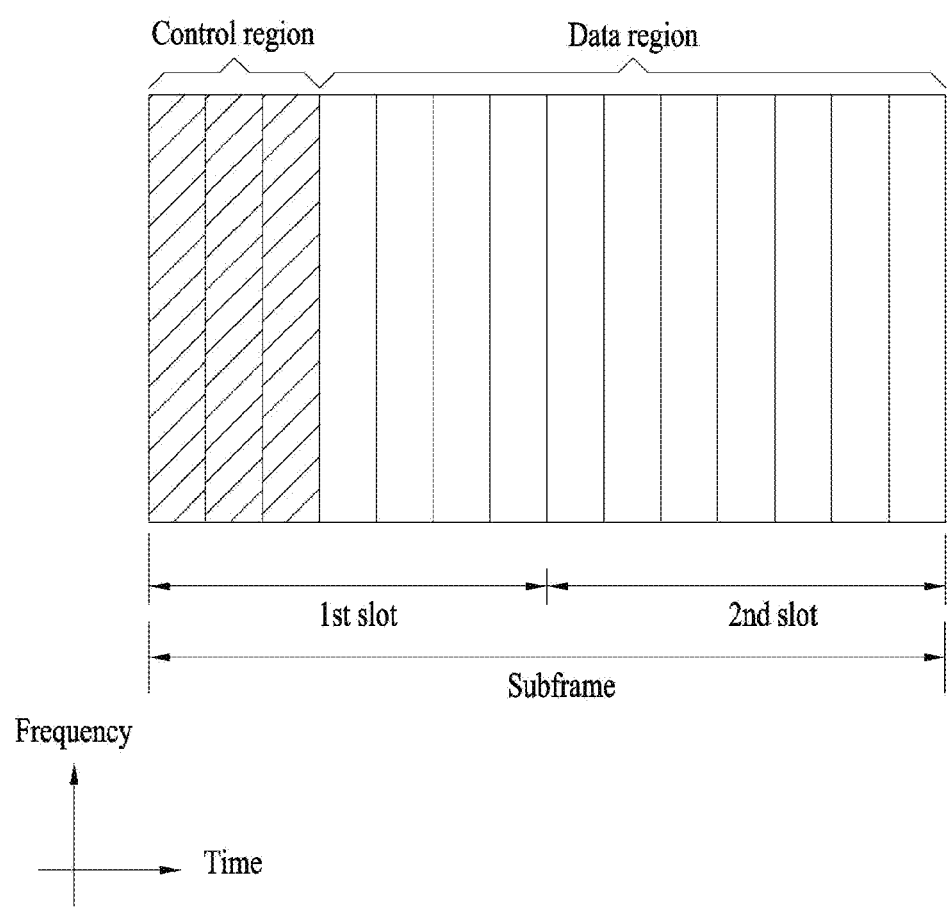
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |

TABLE 3-continued

| Type | Search Space Aggregation Level L | Size [in CCEs] | Number of PDCCH candidates $M^{(L)}$ |
|---|---|---|---|
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
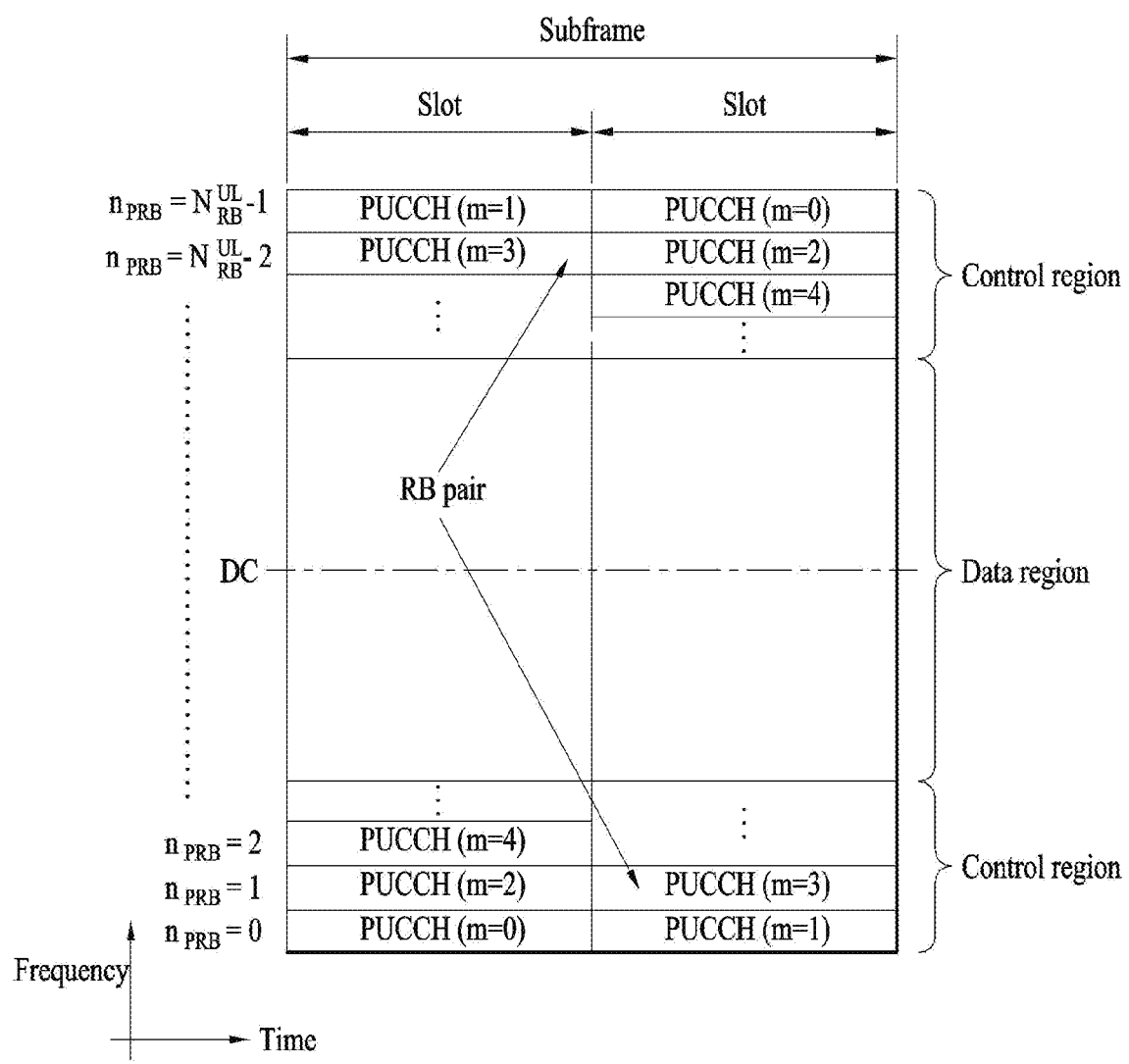
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In a cellular communication system, a base station controls transmission and reception of data transceived with a plurality of user equipments and transmits scheduling information on downlink data transmitted to a user equipment, (e.g., time/frequency on which data is to be transmitted, MCS, HARQ-related information) to the user equipment to enable the user equipment to receive data. Similarly, the base station informs the user equipment of uplink scheduling information to enable the user equipment to transmit uplink data. Recently, in order to support a wider bandwidth while utilizing a legacy band distinction, a CA (carrier aggregation) technology has been introduced to transmit downlink data to a single UE by aggregating unit CC (component carrier). In particular, LTE standard considers a self-CC scheduling technology that each cell transmits a control channel including scheduling information and a cross-CC scheduling technology that a cell transmits a control channel including scheduling information of a different cell in a situation that a plurality of CCs (component carriers) of a different duplex mode or the same duplex mode are aggregated. Although a current LTE standard considers CA that transmits downlink data by aggregating 5 CCs, recently, in order to support rapidly increasing traffic load, CA enhancement transmitting downlink data by aggregating 5 or more CCs (e.g., 8, 16, 32 CCs) is considering. In case of transmitting DCI on each scheduled CC, as the number of simultaneously scheduled CCs is getting bigger, signaling overhead of a control channel including control information on the CCs is increased in proportion to the number of the CCs. And, blind detection complexity of a UE for decoding the control channel increase as well.

In a situation that a plurality of CCs (component carriers) of a different duplex mode or the same duplex mode are aggregated, the present invention proposes a method of signaling control information to a UE and a behavior of the UE to reduce signaling overhead and control information blind detection complexity of the UE. In the following, for clarity, the proposed method is explained based on 3GPP LTE system. Yet, a system range to which the proposed method is applied can be extended to a different system rather than 3GPP LTE system.

For clarity, an operation of simultaneously scheduling a plurality of CCs based on a single control information/ channel is referred to as multi-CC scheduling, a control information/channel performing the multi-CC scheduling is referred to as "mCC (multiple component carrier)-DCI", and a control information/channel scheduling a single CC only is referred to as "sCC (single component carrier)-DCI".

Configuration of Scheduled Cells

According to one embodiment of the present invention, a UE can receive a configuration on whether or not scheduling is performed using mCC-DCI according to a CC/cell.

According to one embodiment of the present invention, if scheduling is performed using the mCC-DCI according to a CC/cell, a cell in which (E)PDCCH monitoring is to be performed can be configured/indicated to a UE. If a specific CC/cell is scheduled by the mCC-DCI, a plurality of cells in which (E)PDCCH monitoring is to be performed can be configured/indicated to the UE for the specific cell.

According to one embodiment of the present invention, if scheduling is performed using the mCC-DCI, RNTI(s) to be used for attaching a CRC of the mCC-DCI can be configured/indicated to the UE.

According to one embodiment of the present invention, if scheduling is performed using the mCC-DCI, time duration (e.g., subframe(s) or subframe (set)) to be scheduled by the mCC-DCI can be configured/indicated to the UE. For each cell, TM-dependent sCC-DCI and/or fallback sCC-DCI based sCC-scheduling can be performed/applied on/to the remaining time duration which is not configured/indicated to the UE.

According to one embodiment of the present invention, when the number of CCs/cells capable of being scheduled by the mCC-DCI at specific timing is set to N, a method of indicating the number of cell combinations equal to or less than K among the N number of cells can be determined as follows.

- An N-bit bitmap can be included in mCC-DCI. The bitmap can indicate CC/cell(s). For example, if a CC/cell is indicated by a value (i.e., 1) of the bitmap, a UE may consider it as the CC/cell is scheduled by the mCC-DCI.
- As a different method, if it is able to configure specific scheduling information of mCC-DCI up to maximum K number of CCs/cells, it may be able to include a field configured by P bits to indicate the CCs/cells. The P can be expressed using equation described in the following.

$$\left\lceil \log_2\left(\sum_{r=1}^{K} {}_NC_r\right) \right\rceil \quad \text{[Equation 1]}$$

In this case, ⌈ ⌉ corresponds to a ceiling function which means a smallest integer equal to or greater than a corresponding value.

Structure of mCC-DCI

According to one embodiment of the present invention, when the number of CCs/cells capable of being scheduled by the mCC-DCI at specific timing is set to N, a method of configuring/applying the mCC-DCI capable of simultaneously scheduling CCs/cells equal to or less than K number of CCs/cells among the N number of CCs/cells is proposed. In this case, N is greater than K.

Specifically, in a situation that the number of CCs/cells capable of being scheduled by the mCC-DCI at specific timing is set to N, it may define a rule that maximum K numbers of CCs/cells are scheduled by the mCC-DCI at the same time. In other word, among the total N number of CCs/cells, a combination of CCs/cells equal to or less than K number of CCs/cells can be scheduled at the same time using the proposed single mCC-DCI. In order to indicate the combination of the CCs/cells equal to or less than K number of CCs/cells, the abovementioned method is applied and a corresponding field can be configured in the proposed mCC-DCI.

Meanwhile, a field size of detail scheduling information (e.g., MCS/TBS, HARQ process number, NDI (new data indicator), RV (redundancy version), RA (resource allocation), DAI (downlink assignment indicator), DMRS antenna port, etc.) configured in the proposed mCC-DCI can be configured on the basis of a case that K number of cells including a biggest scheduling information field size are scheduled at the same time (on the basis of a single cell).

If specific M (where N>K≥M) number of CCs/cells are indicated or scheduled via the mCC-DCI, a scheduling information field for each of the M number of CCs/cells is configured in the mCC-DCI in a concatenated form and the remaining part is padded by a fixed value (e.g., bit "0" or "1") or may indicate different specific information (e.g., UL scheduling DCI).

In this case, K can be configured by a submultiple of N. For example, K=N/2 or N/4 can be satisfied. Or, K can also be configured by a plurality of values (less than N) different from each other. For example, N>K1>K2 can be satisfied.

Figure 5:
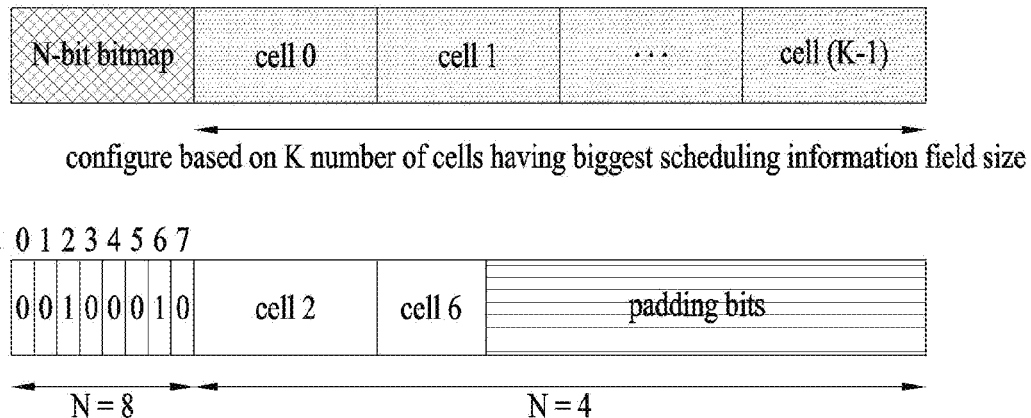
FIG. 5 illustrates a structure of downlink control information scheduling multiple component carriers according to one embodiment of the present invention.

FIG. 5 is a diagram illustrating a general structure and example of mCC-DCI field configuration proposed in the present specification. FIG. 5 (a) illustrates a general structure of mCC-DCI field and FIG. 5 (b) shows an example of configuring the mcc-DCI when a cell 2 and a cell 6 are indicated or scheduled by the mcc-DCI field.

According to one embodiment of the present invention, the configuration of the mCC-DCI can be applied to a TM-dependent DCI format (e.g., 2/2A/2B/2C/2D) and a TM-common DCI format (e.g., 1A), respectively (i.e., one mCC-DCI for transmitting TM-dependent DCI and one mCC-DCI for transmitting TM-common DCI for N number of CCs/cells). Or, the proposed mCC-DCI can be applied to the TM-dependent DCI format only (i.e., sCC-DCI is applied to the TM-common DCI format). Or, the proposed mCC-DCI can be applied to the TM-common DCI format only (i.e., sCC-DCI is applied to the TM-dependent DCI format).

According to one embodiment of the present invention, if a specific cell is configured as an eIMTA (enhanced interference management and traffic adaptation) cell among CCs/cells actually scheduled by the mCC-DCI, whether the specific cell corresponds to a UL SF or a DL SF can be determined based on DL reference configuration (eimta-HARQ-ReferenceConfig-r12).

Fallback Operation Related to eIMTA

According to one embodiment of the present invention, when a specific CC/cell among CCs/cells actually scheduled by the mCC-DCI is configured as an eIMTA cell and an eIMTA UE, which has lost eIMTA DCI, considers a UL/DL configuration as "UL" in a specific SF of the cell by SIB1 (fallback), if the cell is PDSCH scheduled by the mCC-DCI in the specific SF, the eIMTA UE, which has lost eIMTA DCI, reconsiders the specific SF as a DL SF rather than a UL SF. Hence, if the abovementioned condition is satisfied, UE operations described in the following can be defined.

- UE can perform CSI/RRM measurement on the cell in the specific SF.
- UE does not transmit an SRS to the cell in the specific SF.
- UE drops PUSCH retransmission for the cell in the specific SF.

Search Space Candidates of mCC-DCI

According to one embodiment of the present invention, it may define a rule that a UE configured to receive mCC-DCI performs blind decoding on (all or a part of) DCIs described in the following at predefined (or signaled) timing and/or a search space of a specific cell. Fallback DCI described in the following corresponds to TM-common DCI.

TM-dependent mcc-DCI and/or fallback mCC-DCI and/or fallback sCC-DCI for Pcell
In this case, TM-dependent mCC-DCI scheduling target includes Pcell and fallback mCC-DCI scheduling target may or may not include Pcell.
TM-dependent mcc-DCI and/or fallback mCC-DCI and/or TM-dependent sCC-DCI for Pcell and fallback sCC-DCI
In this case, mCC-DCI scheduling target may or may not include Pcell.
TM-dependent mcc-DCI and/or fallback sCC-DCI for a plurality of specific cells among total cells (N number of cells)
In this case, it may be able to define a rule that the TM-dependent mCC-DCI and/or the fallback mCC-DCI include (or does not include) Pcell as a scheduling target cell.

Or, sCC-DCI can be configured/applied to fallback DCI (e.g., DCI format 0/1A) scheduling Pcell or PDCCH common search space-based Pcell scheduling fallback DCI (irrespective of whether or not the fallback DCI is included in mCC-DCI scheduling target cell).

According to one embodiment of the present invention, if a UE receives specific cell-related TM-dependent mCC-DCI and TM-dependent sCC-DCI at the same timing, it may define UE operations described in the following.

UE discards TM-dependent mCC-DCI and preferentially interprets TM-dependent sCC-DCI.
UE discards TM-dependent sCC-DCI and preferentially interprets TM-dependent mCC-DCI.
UE discards both of the two DCIs.

According to one embodiment of the present invention, it may be able to define a rule that TM-dependent mCC-DCI is received in a predefined/preconfigured cell and fallback sCC-DCI is received (i.e., self-CC scheduling) in each cell.

According to one embodiment of the present invention, it may be able to define a rule that fallback mCC-DCI is received in a predefined/preconfigured cell. In this case, the cell can be configured in a manner of being identical or different to/from a cell in which TM-dependent mCC-DCI is transmitted.

According to one embodiment of the present invention, if the number of configured cells or the number of scheduling target CCs/cells is equal to or less (or equal to or greater) than a prescribed level, it may be able to define a rule that sCC-DCI is configured for each CC/cell. For example, when the number of CCs/cells capable of being scheduled by mCC-DCI at specific timing is set to N, if the N is equal to or less (or equal to or greater) than a prescribed value for mCC-DCI capable of scheduling CCs/cells equal to or less than specific K (where N≥K), it may be able to define a rule that sCC-DCI is configured for each CC/cell without configuring mCC-DCI. Similarly, if K is equal to or less (or equal to or greater) than a prescribed value, it may be able to define a rule that sCC-DCI is configured for each CC/cell without configuring mCC-DCI.

As a different example, when mCC-DCI based multi-CC scheduling is configured for the total N number of CCs/cells, the number of actually scheduled (DL) CCs/cells may vary depending on a subframe. For example, the number of CCs/cells to which mCC-DCI based DL is set corresponds to N at specific subframe #n timing. On the contrary, the number of CCs/cells to which mCC-DCI based DL is set at different subframe #(n+k) timing may correspond to K which is less than N. Hence, it may be able to configure/apply mCC-DCI of a different size to the subframe #n and the subframe #(n+k), respectively (mCC-DCI of a smaller size is applied to the subframe #(n+k)). Or, (if K is less than a specific value) a different scheduling scheme can be applied to the two subframes. In particular, mCC-DCI based scheduling scheme is applied to the subframe #n and sCC-DCI based scheduling is applied to the subframe #(n+k).

Utilization of DCI Fields for Unscheduled Cells

According to a further different embodiment of the present invention, it may be able to predefine unused fields of (predetermined) scheduling information to be used for resource allocation according to the number of CCs/cells actually scheduled by mCC-DCI. For example, assume that fields corresponding to partial scheduling information are set to the K (K≤N) number of CCs/cells only and are included in mCC-DCI capable of scheduling the N number of CCs/cells. If the number of CCs/cells actually scheduled by the mCC-DCI at specific timing corresponds to S (S<K), scheduling information corresponding to the S number of CCs/cells is valid only among scheduling information corresponding to the K number of CCs/cells. Fields corresponding to the (K−S) number of CCs/cells can be used for allocating a resource that indicates a scheduling resource region of actually scheduled CCs/cells.

Or, it may be able to promise/predefine unused fields of (predetermined) scheduling information to be used as a virtual CRC (e.g., fixed using a predetermined specific value) according to the number of CCs/cells actually scheduled by mCC-DCI.

Or, it may be able to promise/predefine unused fields of (predetermined) scheduling information to be used as UL grant-related scheduling information according to the number of CCs/cells actually scheduled by mCC-DCI. In this case, it may be able to define a rule that a UL CC scheduled by the UL grant-related scheduling information is restricted to a UL CC associated with a DL CC included in DL CCs capable of being scheduled by the mCC-DCI. Or, in this case, the UL CC scheduled by the UL grant-related scheduling information can be selected as a random UL CC irrespective of the UL CC associated with the DL CC included in DL CCs capable of being scheduled by the mCC-DCI. And, it may also have separate signaling indicating a CC/cell for which the UL grant-related scheduling information is to be used.

TPC & ARI

According to legacy LTE standard, in case of DCI for scheduling Pcell, a TPC field included in the DCI is configured to perform power control of actual PUCCH. In case of DCI for scheduling Scell, it may be able to define a rule that the DCI indicates a resource configured to perform ACK/NACK transmission (i.e., ARI (ACK/NACK resource indicator)). In particular, it may be able to define a rule that both a TPC field and an ARI field are included in mCC-DCI at the same time as a separate bit.

The abovementioned rule can be applied only when the mCC-DCI is configured to include Pcell as a scheduling target cell.

The abovementioned rule can be applied only when the mCC-DCI corresponds to TM-dependent DCI (or fallback DCI).

According to a further different embodiment of the present invention, when it is able to schedule Pcell (or, Scell in which PUCCH is transmitted) by mCC-DCI and a TPC field and an ARI field are configured to be included in the mCC-DCI at the same time as a separate bit, if only the Pcell (or, Scell in which PUCCH is transmitted) is scheduled by the mCC-DCI, it may be able to define a rule that ACK/NACK for the Pcell is transmitted only in a resource configured to transmit PUCCH linked with a CCE at which the mCC-DCI is transmitted. In this case, it may be able to define a rule that the TPC is applied to PUCCH power control and the ARI is discarded or used as a virtual CRC (e.g., a CRC is fixed with a specific value). Or, in this case, the ARI field can be used as additional TPC information. For example, all bit combinations included in the TPC field and the ARI field can indicate one TPC command.

According to a further different embodiment of the present invention, Pcell (or, Scell in which PUCCH is transmitted) can be scheduled by mCC-DCI. When a TPC field and an ARI field are configured to be included in the mCC-DCI at the same time as a separate bit, if at least one Scell is scheduled by the mCC-DCI, it may be able to define a rule that the entire ACK/NACK feedback is transmitted using a PUCCH format 3 or a new PUCCH format indicated by the ARI field. In this case, it may be able to define a rule that the TPC field is applied to PUCCH power control and the ARI field indicates a resource configured to transmit ACK/NACK via higher layer signaling.

According to a further different embodiment of the present invention, when Pcell (or, Scell in which PUCCH is transmitted) is scheduled by sCC-DCI and Scell is scheduled by mCC-DCI, it may be able to make a UE utilize not only TPC of the sCC-DCI for Pcell but also TPC of the mCC-DCI to perform more delicate PUCCH power control.

According to a further different embodiment of the present invention, when a TPC field and an ARI field are configured to be included in the mCC-DCI at the same time as a separate bit, if Pcell (or, Scell in which PUCCH is transmitted) is scheduled by sCC-DCI and Scell is scheduled by mCC-DCI, it may be able to define a rule that a combination of two TPC values respectively included in the sCC-DCI and the mCC-DCI is to be applied to predetermined PUCCH power control.

For example, a PUCCH power control table can be configured in advance using a TPC command of 4 bits in total by combining a 2-bit TPC field of the sCC-DCI with a 2-bit TPC field of the mCC-DCI.

As a different example, it may be able to define a rule that the 2-bit TPC field of the sCC-DCI and the 2-bit TPC field of the mCC-DCI are configured to indicate the same value in advance and a UE is configured to apply a TPC command corresponding to the value to PUCCH power control.

As a further different example, it may be able to define a rule that the 2-bit TPC field of the sCC-DCI and the 2-bit TPC field of the mCC-DCI are configured to respectively indicate a different value in advance and a UE is configured to accumulate two values and apply an accumulated value to PUCCH power control.

Figure 6:
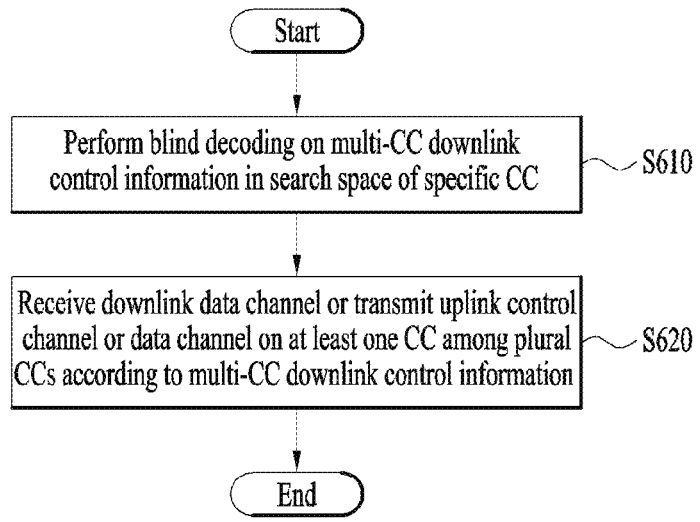
FIG. 6 illustrates an operation according to one embodiment of the present invention.

FIG. 6 illustrates an operation according to one embodiment of the present invention.

FIG. 6 illustrates an operation for receiving or transmitting a signal on a plurality of component carriers (CCs) in a wireless communication system. The operation is performed by a UE (user equipment).

The UE can perform blind decoding on multi-CC downlink control information in a search space on a specific CC to receive the multi-CC downlink control information that schedules at least one of a plurality of the CCs [S610]. The UE can receive a downlink data channel or transmit an uplink control channel or a data channel on at least one of a plurality of the CCs according to the received multi-CC downlink control information [S620]. In this case, the received multi-CC downlink control information can include transmission mode (TM)-dependent multi-CC downlink control information or fallback multi-CC downlink control information.

If downlink control information for a primary-CC is not included in the received multi-CC downlink control information, the UE can additionally receive single-CC downlink control information for the primary-CC.

The UE can receive information on the specific CC on which the blind decoding is to be performed.

If both TM-dependent multi-CC downlink control information and TM-dependent single CC downlink control information are received for the specific CC among a plurality of the CCs at specific timing, the UE can discard the received TM-dependent single CC downlink control information.

If the UE fails to perform blind decoding on the multi-CC downlink control information, the UE can perform blind decoding on fallback multi-CC downlink control information on a predetermined CC.

The multi-CC downlink control information can be received when the number of a plurality of the CCs is equal to or greater than a specific number. And, the number of CCs scheduled by the multi-CC downlink control information may vary depending on a subframe.

Fields for a CC not scheduled by the multi-CC downlink control information can be used as a different field for a CC scheduled by the multi-CC downlink control information. In this case, the different field can include a virtual CRC (cyclic redundancy check) bit field or an uplink scheduling-related field.

The multi-CC downlink control information includes an ARI (ACK/NACK (ACKnowledgement/Negative ACK) resource indicator) field independent from a transmit power control command field and the ARI field can indicate a resource used for making ACK/NACK feedback for a non-primary-CC scheduled by the multi-CC downlink control information.

In the foregoing description, embodiments of the present invention have been briefly explained with reference to FIG. 6. An embodiment related to FIG. 6 can alternatively or additionally include at least a part of the aforementioned embodiments.

Figure 7:
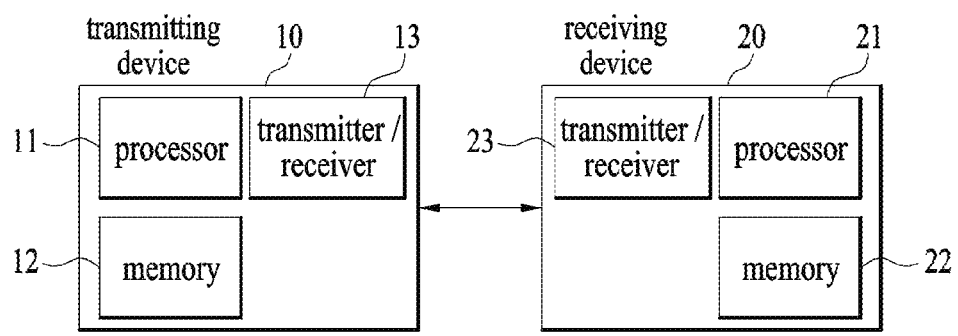
FIG. 7 is a block diagram of a device for implementing embodiment(s) of the present invention.

FIG. 7 is a block diagram illustrating a transmitting device 10 and a receiving device 20 configured to implement embodiments of the present invention. Each of the transmitting device 10 and receiving device 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitting device 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiving device 20 is configured as a reverse procedure of the signal processing procedure in the transmitting device 10. The RF unit 23 of the receiving device 20 receives a radio signal transmitted from the transmitting device 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitting device 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitting device 10 on uplink, and operates as the receiving device 20 on downlink. In embodiments of the present invention, the eNB operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method for a terminal receiving or transmitting a signal on a plurality of component carriers (CCs) in a wireless communication system, the method comprising:
    performing blind decoding on multi-CC downlink control information in a search space of a specific CC, wherein the multi-CC downlink control information includes information on scheduling K number of CCs among N number of the plurality of CCs; and
    receiving a downlink data channel or transmitting an uplink control channel or a data channel on the K number of CCs according to the multi-CC downlink control information,
    wherein the multi-CC downlink control information includes an N-bits bitmap, a K number of scheduling information fields, and UL grant-related scheduling information,
    wherein each of the N-bits bitmap informs whether each of the N number of the plurality of CCs is scheduled,
    wherein each of the K number of scheduling information fields is scheduling information on each of the K number of CCs,
    wherein the UL grant-related scheduling information is scheduling information on a UL CC associated with a DL CC scheduled by the multi-CC downlink control information,
    wherein the multi-CC downlink control information comprises transmission mode (TM)-dependent multi-CC downlink control information or fallback multi-CC downlink control information,
    wherein the multi-CC downlink control information is received when a number of the plurality of CCs is equal to or greater than a predetermined number, and
    wherein N and K are positive integers, N is divisible by K, and N≥K≥2.

2. The method of claim 1, further comprising:
    additionally receiving single-CC downlink control information for a primary CC, when downlink control information for the primary CC is not contained in the multi-CC downlink control information.

3. The method of claim 1, further comprising:
receiving information on the specific CC on which the blind decoding is to be performed.

4. The method of claim 1, further comprising:
discarding a TM-dependent single CC downlink control information, when both the TM-dependent multi-CC downlink control information and the TM-dependent single CC downlink control information are received for the specific CC among the plurality of CCs at a specific timing.

5. The method of claim 1, wherein the K number of CCs varies per subframe.

6. The method of claim 1, wherein the multi-CC downlink control information further comprises information on a resource allocation for the K number of CCs.

7. The method of claim 1, wherein the multi-CC downlink control information further comprises a virtual cyclic redundancy check (CRC) bit field.

8. The method of claim 1, wherein the multi-CC downlink control information comprises an ACKnowledgement/Negative ACK (ACK/NACK) resource indicator (ARI) field being independent from a transmit power control command field, and
wherein the ARI field indicates a resource used for ACK/NACK feedback for a non-primary-CC scheduled by the multi-CC downlink control information.

9. A terminal configured to receive or transmit a signal on a plurality of component carriers (CCs) in a wireless communication system, the terminal comprising:
a transmitter;
a receiver; and
a processor that controls the transmitter and the receiver, the processor performs blind decoding on multi-CC downlink control information in a search space of a specific CC, wherein the multi-CC downlink control information includes information on scheduling K number of CCs among N number of the plurality of CCs, and receives a downlink data channel or transmits an uplink control channel or a data channel on the K number of CCs according to the multi-CC downlink control information,
wherein the multi-CC downlink control information includes an N-bits bitmap, a K number of scheduling information fields, and UL grant-related scheduling information,
wherein each of the N-bits bitmap informs whether each of the N number of the plurality of CCs is scheduled,
wherein each of the K number of scheduling information fields is scheduling information on each of the K number of CCs,
wherein the UL grant-related scheduling information is scheduling information on a UL CC associated with a DL CC scheduled by the multi-CC downlink control information,
wherein the multi-CC downlink control information comprises transmission mode (TM)-dependent multi-CC downlink control information or fallback multi-CC downlink control information,
wherein the multi-CC downlink control information is received when a number of the plurality of CCs is equal to or greater than a predetermined number, and
wherein N and K are positive integers, N is divisible by K, N≥K≥2.

10. The terminal of claim 9, wherein the processor additionally receives single-CC downlink control information for the primary CC, when downlink control information for a primary CC is not contained in the multi-CC downlink control information.

11. The terminal of claim 9, wherein the processor receives information on the specific CC on which the blind decoding is to be performed.

12. The terminal of claim 9, wherein the processor discards a TM-dependent single CC downlink control information, when both the TM-dependent multi-CC downlink control information and the TM-dependent single CC downlink control information are received for the specific CC among the plurality of CCs at a specific timing.

13. The terminal of claim 9, wherein the K number of CCs varies per subframe.

14. The terminal of claim 9, wherein the multi-CC downlink control information further comprises information on a resource allocation for the K number of CCs.

15. The terminal of claim 9, wherein the multi-CC downlink control information further comprises a virtual cyclic redundancy check (CRC) bit.

16. The terminal of claim 9, wherein the multi-CC downlink control information comprises an ACKnowledgement/Negative ACK (ACK/NACK) resource indicator (ARI) field being independent from a transmit power control command field, and
wherein the ARI field indicates a resource used for ACK/NACK feedback for a non-primary-CC scheduled by the multi-CC downlink control information.

* * * * *